(12) United States Patent
Adrian

(10) Patent No.: US 6,799,473 B2
(45) Date of Patent: Oct. 5, 2004

(54) LOAD CELL MOUNTING APPARATUS AND METHOD

(75) Inventor: Steve Adrian, London, OH (US)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 10/135,239

(22) Filed: Apr. 30, 2002

(65) Prior Publication Data

US 2003/0200818 A1 Oct. 30, 2003

(51) Int. Cl.$^7$ .............................................. G01N 3/02
(52) U.S. Cl. ...................................................... 73/856
(58) Field of Search .................... 73/862.391, 862.392, 73/862.393, 856, 121, 826, 828; 188/2 R

(56) References Cited

U.S. PATENT DOCUMENTS

| | | |
|---|---|---|
| 1,498,289 A | 6/1924 | Parsley |
| 2,570,321 A | 10/1951 | Christoffer |
| 3,943,761 A | 3/1976 | Shoberg et al. |
| 4,362,053 A | 12/1982 | Barrett |
| 4,373,402 A | 2/1983 | Barrett |
| 4,386,533 A * | 6/1983 | Jackson et al. ........ 73/862.626 |
| 4,433,586 A | 2/1984 | Ohrnell et al. |
| 4,672,844 A | 6/1987 | Meyer |
| 5,038,622 A | 8/1991 | Tijmann |
| 5,392,660 A | 2/1995 | Hodson et al. |
| 5,563,355 A | 10/1996 | Pluta et al. |
| 6,105,438 A | 8/2000 | Gieseke |
| 6,595,045 B1 * | 7/2003 | Fuglewicz et al. ............ 73/129 |

* cited by examiner

Primary Examiner—Edward Lefkowitz
Assistant Examiner—Corey D. Mack
(74) Attorney, Agent, or Firm—Rankin, Hill, Porter & Clark LLP; Alan T. McDonald; Vincent Ciamacco

(57) ABSTRACT

A load cell alignment apparatus for aligning a load cell during an axial tension test of a brake cable. The apparatus includes a mounting structure, an alignment structure, a biasing device, and the load cell. The alignment structure is connected between the mounting structure and the biasing device. The biasing device is connected to the load cell and applies a tension preload to the load cell, and the alignment structure, in response to the tension preload, properly aligns the load cell with an axis for subsequent measurement of applied tension on the brake cable. The alignment structure permits only linear axial tension to be applied to the load cell in response to application of a further tension load on the load cell.

19 Claims, 3 Drawing Sheets

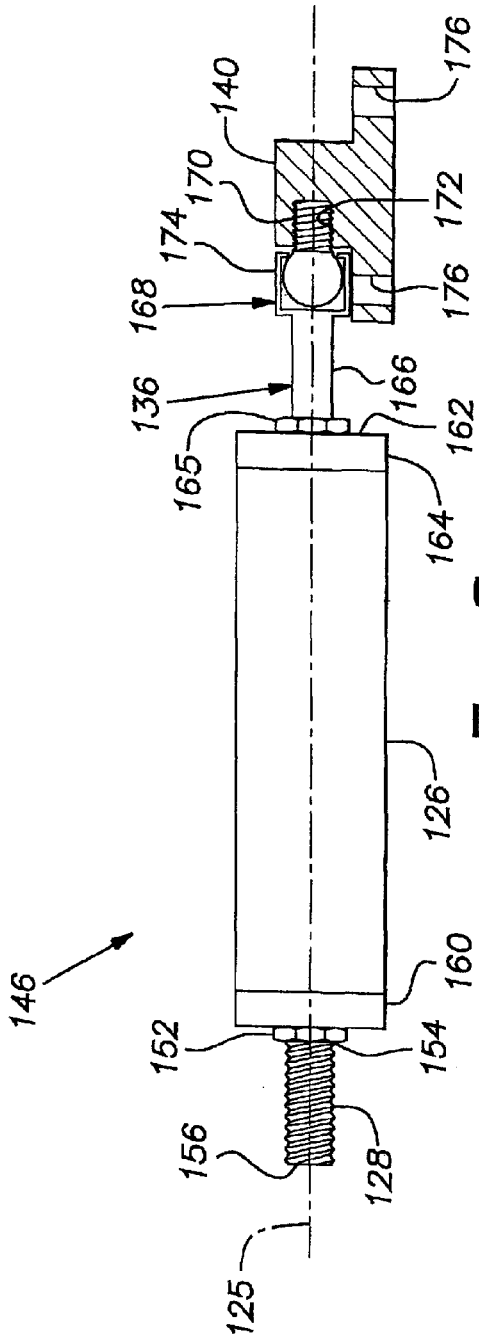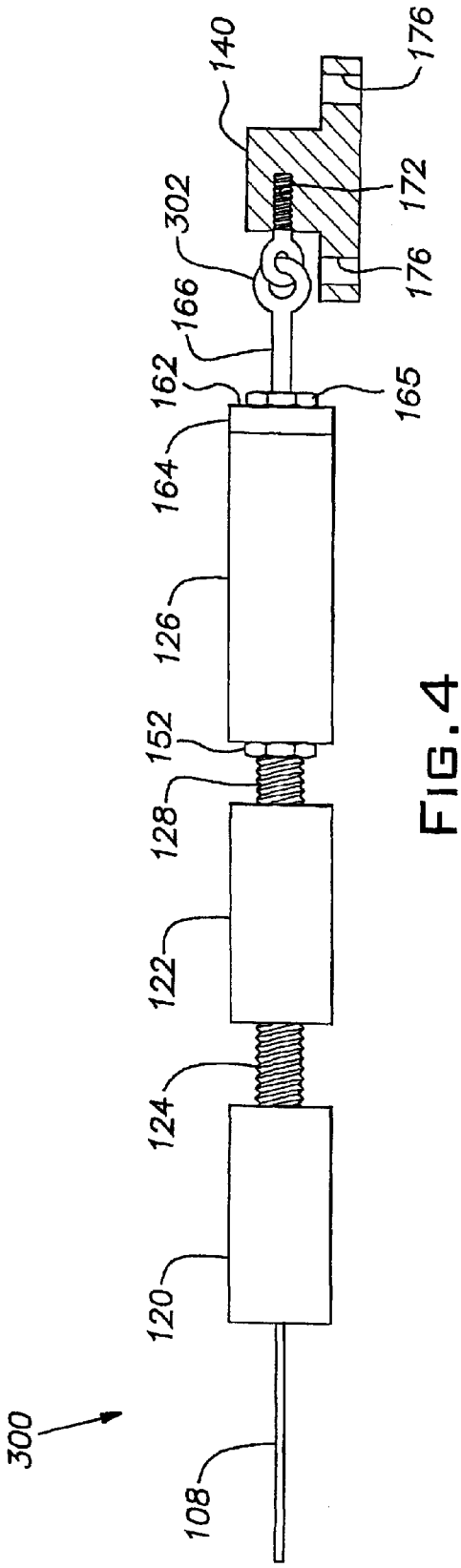

LOAD CELL MOUNTING APPARATUS AND METHOD

BACKGROUND OF THE INVENTION

1. Field of the Invention

The present invention generally relates to a mounting for a load cell and, more specifically, to a load cell mounting method and apparatus to facilitate accurate measurement of an automotive brake cable tension.

2. Description of Related Art

In automobile manufacture, automotive parts are routinely tested. The parts are tested during the research and development stage of automotive design, and the parts are tested later for quality assurance purposes.

In a test of an automotive brake system, a brake cable in a brake assembly is tension loaded. The tension load on the brake cable is measured to determine the tension load applied to the brake cable at the brake handle and the tension force delivered to the brake assembly. These two tension measurements are used to determine the efficiency of the brake cable assembly and to determine whether sufficient braking force is delivered to the brake assembly by the brake cable.

It is desirable to produce an accurate proportional relationship between the strain on the brake assembly and the applied load, and thereby to measure the absolute tension transferred by the brake cable to the brake assembly. However, factors such as non-linearity, hysteresis and temperature effects on a load cell can create errors and decrease the accuracy of the measurement.

Non-linearity errors are the result of the brake cable being misaligned with the device that is provided to measure the tension on the cable. Such non-alignment creates side tension loads that are at angles to the axis of the cable. These side loads have several vector components. A first vector component is parallel to the axis and contributes to the axial tension load. However, other vector components are skewed from the axis and do not add to the axial tension load. Introduction of such side loads will result in incorrect measurements of the forces applied to the brake assembly. As such, during testing of brake cable assemblies, misalignment of testing components is a common source of measurement error.

Therefore, there exists a need in the art for a method and assembly to accurately align the brake components and, more specifically, the testing components, so as to eliminate the effects of side loading and thereby obtain more accurate measurement of tension forces on the brake cable at the brake assemblies.

SUMMARY OF THE INVENTION

The present invention is directed toward a method and assembly to accurately align the testing components with an axis of a brake cable. The present invention is further directed toward a method and assembly to eliminate the effects of side loading on a brake cable so as to accurately measure the tension force applied by the brake cable.

The present invention provides a load cell alignment apparatus for aligning a load cell during testing of a brake cable assembly. The apparatus includes a mounting structure, and an alignment structure secured between the mounting structure and the load cell. The alignment structure ensures that only axial tension is applied to the load cell during a testing procedure.

The present invention also provides a method of automatically aligning a load cell on a load cell axis during a tension test of a cable. The method includes providing an alignment structure that automatically aligns the load cell on the load cell axis during application of a tension load. The method also includes applying a tension load to the load cell and using the applied tension to automatically align the load cell and cable on the load cell axis.

The present invention further provides a method for measuring a brake cable efficiency. The method includes applying a first force to a brake handle so as to create a second, subsequent force at a brake hub. The first force and the second force are measured. The first and second force measurements are compared to determine the brake cable efficiency.

BRIEF DESCRIPTION OF THE DRAWINGS

These and further features of the invention will be apparent with reference to the following description and drawings, wherein:

FIG. 2 is an enlarged schematic view of an apparatus comprising a portion of the system shown in FIG. 1;

FIG. 4 is a schematic view of an apparatus comprising a second embodiment of the invention.

DETAILED DESCRIPTION OF PREFERRED EMBODIMENTS

Figure 1:
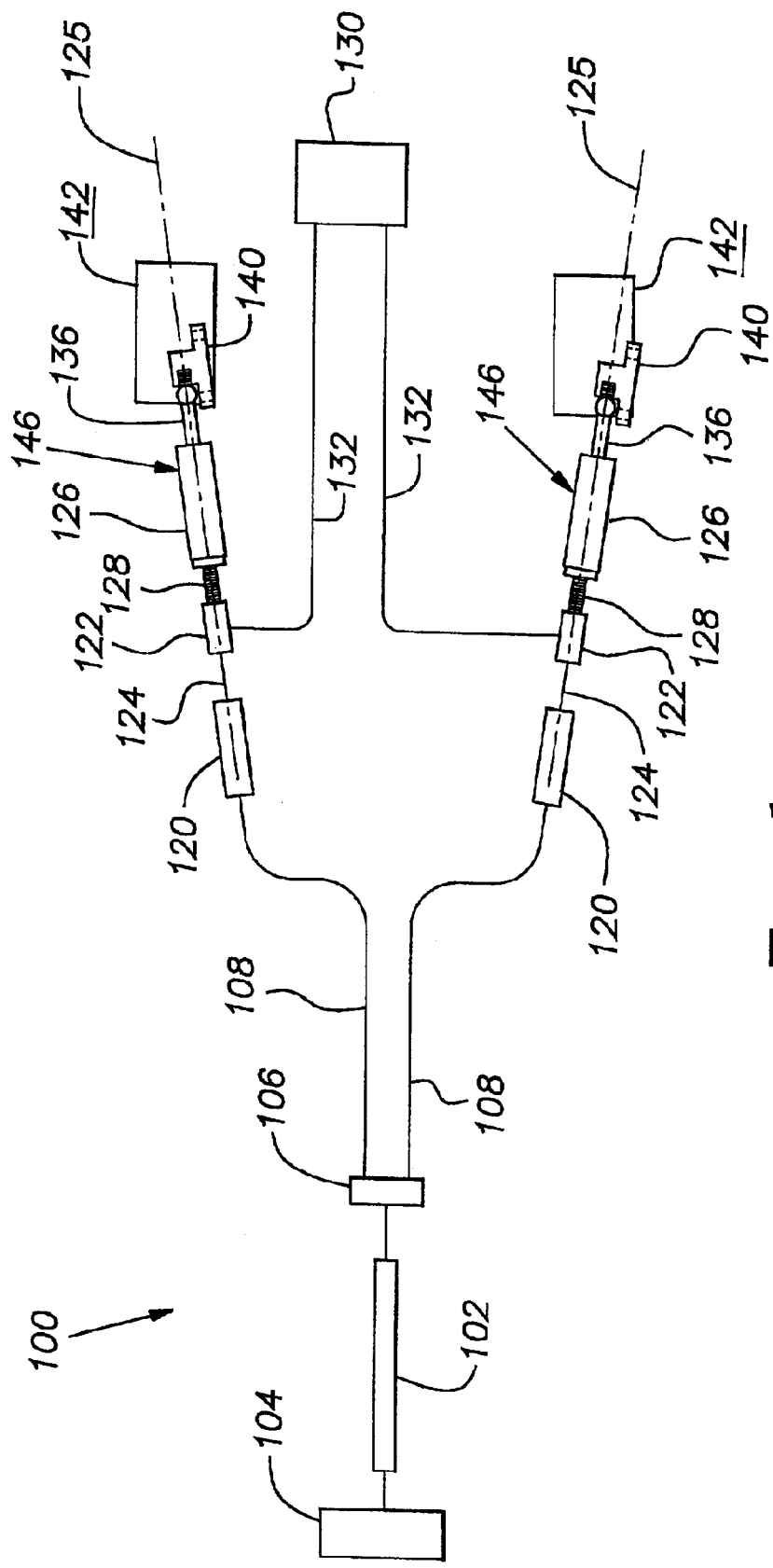
FIG. 1 is a schematic view of a system comprising a first embodiment of the invention.

A load cell mounting system 100 comprising a first embodiment of the invention is shown in FIG. 1. The system 100 properly aligns a load cell with a cable during tension load testing of the cable, and thereby to eliminate or minimize side loading of the cable that could interfere with the accuracy of the test results. Specifically, the illustrated system 100 is used to apply a tension load on an automotive brake cable and to measure the amount of braking force (cable tension) delivered to the brakes.

The system 100 includes a parking brake handle 102 and a handle load cell 104. The handle load cell 104 measures a force exerted on the parking brake handle 102. The measurement information is forwarded to a computer or display device (not shown). Movement of the parking brake handle 102 is communicated to a force equalizer 106, which in turn applies a tension load to two brake cables 108.

One end of each cable 108 connects to the equalizer 106, while the opposite end of each cable 108 connects to a respective cable adaptor 120. The cable adaptor 120 represents the point where the cable 108 would attach to a brake assembly in an automobile. Thus, a force or tension load applied to the cable adaptor 120 is equivalent to a force or tension load applied to an automobile brake assembly.

The cable 108 is preferably a non-elastic cable with a metal strand core. The cable 108 has both a low level of stretch and of torque in response to the application of a tension load.

A load cell 122 communicates with the cable adaptor 120 through a cable 124. The cable 124 and the load cell 122 are linearly aligned with each other and centered on an axis 125. The load cell 122 also communicates with a biasing apparatus 126 through a threaded rod 128, which is likewise linearly aligned with and centered on the axis 125.

In this embodiment, the load cell 122, also called a force transducer, operates on the principle that the resistance of a piezoresistor will increase when the piezoresistor flexes under an applied force. The load cell 122 concentrates an applied force, through a plunger, directly to a silicon-based sensing element. The amount of resistance changes in proportion to the amount of force applied. This change in the resistance results in a corresponding change in the voltage (V) output level. Suitable load cells are commercially available from, for example, Honeywell Sensing and Control, Inc. (Freeport, Ill.).

A strain amplifier 130 communicates with the load cell 122 through a wire 132. The strain amplifier 130 includes an LCD digital display and further communicates with a computer (not shown). The strain amplifier 130 sends an excitation voltage to the load cell 122 and conditions the return signal.

An alignment structure 136 communicates with both the biasing apparatus 126 and a mounting structure 140. The mounting structure 140 mounts on a surface 142. The biasing apparatus 126, the alignment structure 136 and the mounting structure 140 together form a mounting assembly 146.

With reference to FIG. 2, the mounting assembly 146 includes the biasing apparatus 126 that communicates with the load cell 122 through the rod 128, as described above. The rod 128 is a stud that extends into a first end cap 160 of the biasing apparatus 126 and has a nut assembly 152 threaded thereto at a first threaded portion 154. The rod 128 is threaded into the load cell 122 at a second threaded portion 156, opposite the first threaded portion 154 (FIG. 1). Accordingly, both the nut assembly 152 and the load cell 122 define threaded apertures that receive the rod 128.

The alignment structure 136 fastens to a second endcap 164, which is connected to an end of the biasing apparatus 126. The second endcap 164 and a jam nut 165 each define an aperture. The alignment structure 136 includes a rod 166 threaded at a first end that extends through the apertures defined by the jam nut 165 and the second endcap 164 and into the biasing apparatus 126. A non-threaded second end of the rod 166 connects with a ball joint assembly 168.

The ball joint assembly 168 includes a threaded portion 170 and a ball joint 174. The threaded portion 170 threads into a threaded aperture 172 in the mounting block 140. The ball joint 174 is a commercially available, steel ball-and-socket type ball joint. The ball joint 174 preferably has a low-friction polymeric inner sleeve, as known to one skilled in the art.

The mounting structure 140 has a plurality of boltholes 176 that align with boltholes (not shown) in the mounting surface 142. Bolts (not shown) extend through the boltholes 176 and further through the mounting surface 142 to secure the mounting structure 140 to the mounting surface 142.

Figure 3:
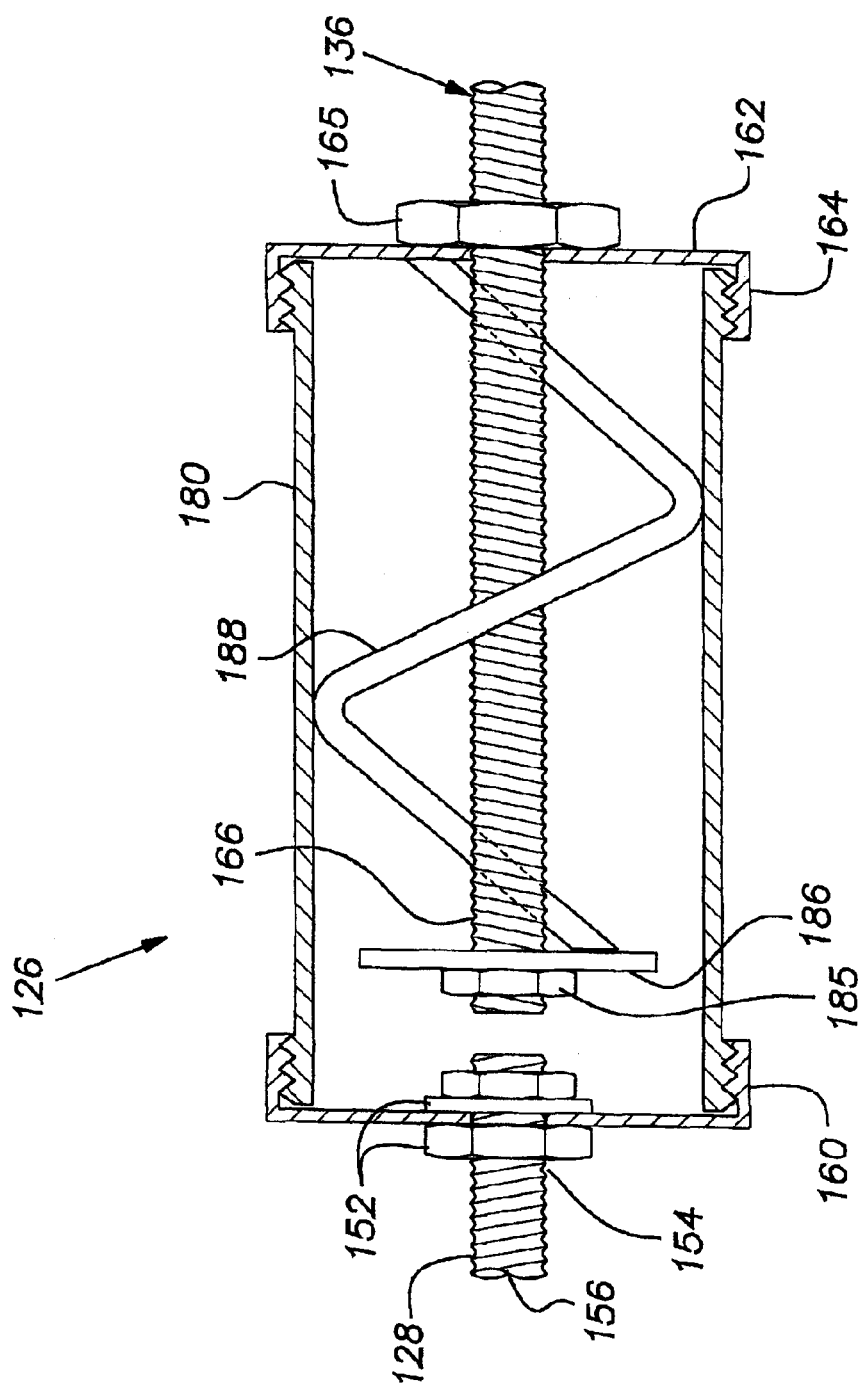
FIG. 3 is a schematic cross-sectional view of a portion of the apparatus shown in FIG. 2.

With reference to FIG. 3, the biasing apparatus 126 includes a cylindrical main body 180 that is threaded at first and second ends. The first endcap 160 threadedly secures to the first threaded end, and the second endcap 164 threadedly secures to the second threaded end, opposite the first threaded end. The nut assembly 152 includes a pair of nuts and a washer adjacent the first endcap 160 on the biasing apparatus 126. The rod 128 extends through the nut assembly 152, and through an aperture in the first endcap 160, into the main body 180. Accordingly, the nut assembly 152 threadedly secures the rod 152 to the first endcap 160.

The rod 166 extends into the cylindrical main body 180, as described above. A nut 185 threadedly secures a washer 186 to an end the rod 166.

The main body 180 houses a spring 188. The spring 188 wraps around the rod 166 and is disposed between the second endcap 164 and the washer 186. The jam nut 165 is wider than the aperture in the second endcap 164. Accordingly, the second endcap 164 and the washer 186 retain the spring 188 in a compressed condition. Further, the rod 166 can move longitudinally while influenced by the bias of the spring 188.

During operation, the jam nut 165 is rotated, if desired, to move the rod 166 relative to the second endcap 164 and adjust the compression of the spring 188. The second endcap 164 and the washer 186 compress the spring 188, and with the jam nut 165, maintain the desired spring compression. The spring compression establishes a preload or biasing tension on the load cell 122. In response to the preload tension, the joint 168 swivels, rotates to align the load cell 122 with the axis 125 and thereby minimizes or eliminates tension side loading on the load cell 122.

When the tension testing begins, a force is applied to the handle 102 and is measured by the load cell 104. Information about the force is communicated to the computer. The force on the handle 102 is distributed by the equalizer 106 equally to each cable 108, thus the equalizer 106 applies a tension load to each cable 108.

The cable 108 communicates the tension load to the cable adaptor 120. In response, the cable adaptor 120 communicates the tension load to the load cell 122 through the rod 124. The joint 168 swivels, rotates and otherwise adjusts to align the load cell 122 with the axis 125, minimizing or eliminating tension side loading on the load cell 122. Accordingly, the applied tension load on the load cell 122 is an axial tension load only and the load cell 122 can thus selectively measure the axial tension load.

The load cell 122 generates a signal in response to the tension load. The wire 132 communicates the signal to the strain amplifier 130 to indicate the tension load placed on the load cell 122. The strain amplifier 130 displays information about the tension load in response to the signal. Further, the computer can also compare the force measurement information of the load cell 104 with the tension load measurement information of the load cell 122. The computer can determine the difference between the measurements and calculate both an absolute tension load on the load cell 122 and a differential tension load with respect to the applied force on the handle 102 and the resultant tension load on the load cell 122. Such information will be used to determine the efficiency of force transfer from the brake handle to the brake hub. A predetermined range of acceptable brake efficiency values are compared with the measured brake efficiency value to determine whether sufficient force is being applied to the brakes to engage the brake pads with the brake drum.

FIG. 4 shows an apparatus 300 according to a second embodiment of the invention. The apparatus 300 includes many parts that are substantially the same as corresponding parts of the mounting apparatus 146; this is indicated by the use of the same reference numerals in FIGS. 1 and 4. The apparatus 300 differs in that it includes a universal joint 302 rather than the ball joint 168. The universal joint 302 connects the biasing apparatus 126 to the mounting block 140.

During operation, the universal joint 302 swivels, rotates and otherwise adjusts to reduce or eliminate tension side loading on the load cell 122. Accordingly, the only tension load on the load cell 122 is an axial tension load.

The load cell 122 generates a signal in response to the axial tension load. The wire 132 communicates the signal to the strain amplifier 130. A sensor (not shown) measures variables, such as the temperature, and communicates with the strain amplifier 130. The strain amplifier 130 displays information about the tension load in response to the signal and the other measured variables.

The embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. An apparatus for tension testing of a cable of a brake system, said apparatus comprising:
    a load cell having a longitudinal axis and first and second ends, said first end being for connection to a first end of the cable;
    a mounting structure adapted for securement to a surface exterior to the apparatus; and
    an alignment structure connected between the mounting structure and the second end of the load cell, the alignment structure being operable to align the longitudinal axis of the load cell with an axis of the cable when a linear tension load is applied to the cable of the brake system, whereby the linear tension load is applied to the load cell only along the longitudinal axis of the load cell.

2. The apparatus as defined in claim 1, wherein the alignment structure includes a biasing apparatus, the biasing apparatus being operable to apply a preload tension to the load cell and to maintain the preload tension on the load cell during the tension test of the cable of the brake system.

3. The apparatus as defined in claim 2, wherein the biasing apparatus comprises a main housing having first and second ends, the biasing apparatus further comprising a first cap on the first end, and a second cap on the second end, the first cap defining an aperture; a spring inside the housing being disposed between the first and second caps; a stud having a threaded portion, an extended portion and a washer, the threaded portion threadedly connecting the stud to the load cell, the extended portion extending through the aperture and further through the spring, and the washer being disposed in the housing between the spring and the second cap; and a jam nut on the threaded portion outside of the main housing, whereby the jam nut and the washer cooperate with each other to maintain the spring in a compressed state.

4. The apparatus as defined in claim 1, wherein the alignment structure comprises a ball joint that permits the load cell to move relative to the mounting structure.

5. The apparatus as defined in claim 1, wherein the alignment structure comprises a universal joint that permits the load cell to move relative to the mounting structure.

6. The apparatus as defined in claim 1, wherein the brake system further comprises a handle connected to a second end of the cable, and wherein the apparatus further comprises a second load cell communicating with the handle and being operable to measure a force applied to the handle and to signal the handle force measurement.

7. The apparatus as defined in claim 6, further comprising a device that is operable to receive the linear axial tension load measurement and the handle force measurement, and is further operable to compare the linear tension load measurement and the handle force measurement.

8. The apparatus as defined in claim 1, wherein the longitudinal axis of the load cell is aligned with the axis of the cable as a result of movement of the alignment structure relative to the mounting structure.

9. The apparatus as defined in claim 8, further comprising a biasing device connected between the alignment structure and the second end of the load cell, said biasing device being operable to apply a predetermined biasing tension on the second end of the load cell.

10. The apparatus as defined in claim 1, wherein the alignment structure is operable to align the load cell longitudinal axis with the cable axis such that the load cell longitudinal axis is substantially coaxial with the cable axis whereby the linear tension load is applied to the load cell only along the longitudinal axis of the load cell.

11. A method of automatically linearly aligning a load cell with an axis during a tension test of a brake system, comprising the steps of:
    providing an alignment structure operatively connected to the load cell, the alignment structure being operable to automatically linearly align the load cell with the axis in response to a tension load;
    applying a first tension load on the load cell and the alignment structure, and thereby automatically linearly aligning the load cell with the axis;
    applying a second tension load to the brake system, thereby applying the second tension load on the load cell and the alignment structure;
    generating a signal in response to the second tension load, the signal having a signal strength proportional to the second tension load; and
    measuring the signal strength to determine a second tension load measurement.

12. The method as defined in claim 11, wherein the load cell has a first end connected to a cable of the brake system and a second end connected to the alignment structure, and wherein the first tension load is applied to the second end of the load structure and the second tension load is applied to the first end of the load structure through the cable.

13. A system for testing a tension loading on a cable in an automotive brake system, comprising:
    a mounting base adapted for securement to a surface exterior to the system;
    an alignment structure connected to the mounting base;
    a load cell having a longitudinal axis and first and second ends, said first end being for connection to the cable, said load cell being operable to measure an applied tension load on the cable during tension testing of the cable;
    a biasing device connected between the alignment structure and the second end of the load cell, said biasing device being operable to apply a predetermined biasing tension on the second end of the load cell; and
    wherein the alignment structure is operable to align the longitudinal axis of the load cell with an axis of the cable when the predetermined biasing tension is applied to the second end of the load cell and when a linear tension load is applied to the cable of the brake system.

14. The testing system as defined in claim 13, wherein the automotive brake system further comprises a parking brake handle for receiving a force and responding by applying the linear tension load to the cable, and wherein the testing system further comprises a second load cell operable to measure the force applied to the parking brake handle and a computer communicating with the first and second load cells that is operable to compare the force with the linear tension load.

15. The testing system as defined in claim 13, wherein the longitudinal axis of the load cell is aligned with the axis of the cable as a result of movement of the alignment structure relative to the mounting base.

16. A method for measuring a brake cable efficiency, comprising the steps of:

applying a first force to a brake handle so as to create a second, subsequent force at a brake hub;

measuring the first force;

measuring the second force; and comparing the first and second forces to determine the brake cable efficiency.

17. The method as defined in claim 16, further comprising the step of minimizing side loadings on the cable.

18. The method as defined in claim 16, further comprising the step of aligning the cable.

19. The method as defined in claim 16, further comprising the step of comparing the determined brake cable efficiency to a predetermined range of acceptable brake cable efficiency values.

* * * * *

UNITED STATES PATENT AND TRADEMARK OFFICE
CERTIFICATE OF CORRECTION

PATENT NO.    : 6,799,473 B2 Page 1 of 1
DATED         : October 5, 2004
INVENTOR(S)   : Steve Adrian It is certified that error appears in the above-identified patent and that said Letters Patent is hereby corrected as shown below:

<u>Column 5,</u>
Line 64, after "receive the linear" delete "axial".

Signed and Sealed this

Eighth Day of November, 2005

JON W. DUDAS
*Director of the United States Patent and Trademark Office*